United States Patent
Chang

(10) Patent No.: US 6,831,789 B2
(45) Date of Patent: Dec. 14, 2004

(54) ROTATING PERIODIC COLOR-REGULATING MODULE OF AN IMAGE DISPLAY DEVICE

(75) Inventor: Sean Chang, Taoyuan (TW)

(73) Assignee: Delta Electronics, Inc., Hsien (TW)

( * ) Notice: Subject to any disclaimer, the term of this patent is extended or adjusted under 35 U.S.C. 154(b) by 0 days.

(21) Appl. No.: 10/409,179

(22) Filed: Apr. 9, 2003

(65) Prior Publication Data
US 2004/0075911 A1 Apr. 22, 2004

(30) Foreign Application Priority Data
Oct. 18, 2002 (TW) ........................................ 91124036 A

(51) Int. Cl.$^7$ ............................................. G02B 27/14
(52) U.S. Cl. ...................... 359/634; 359/636; 359/211; 359/629; 353/31; 353/34; 362/293
(58) Field of Search ................................. 359/634, 636, 359/629, 211; 353/31, 34, 81, 84; 362/293, 268

(56) References Cited

U.S. PATENT DOCUMENTS 5,845,981 A * 12/1998 Bradley ........................ 353/31

* cited by examiner

Primary Examiner—Fayez Assaf
(74) Attorney, Agent, or Firm—Birch, Stewart, Kolasch & Birch, LLP

(57) ABSTRACT

A rotating periodic color-regulating module of the image display device is disclosed to improve the usage of light. The rotating periodic color-regulating module comprises a color separating light guide and a color-regulating processor. By using a grating element installed in front of the color separating light guide, the incident light is interleaved into three parts of different wavelengths, red (R), green (G) and blue (B), propagating toward the corresponding color filters. Part of the light is reflected by the color filters, then reflected by the mirror around the grating element, and goes back to the color filters. The incident light is divided into three uniform beams of light, R, G and B, to the color-regulating processor. The color-regulating processor changes the outgoing position and order of the light beams periodically and rapidly for displaying image.

11 Claims, 5 Drawing Sheets

ROTATING PERIODIC COLOR-REGULATING MODULE OF AN IMAGE DISPLAY DEVICE

BACKGROUND OF THE INVENTION

1. Field of Invention

The invention relates to a rotating periodic color-regulating module of the image display device for regulating the color of a light beam. More particularly, the invention relates to a rotating periodic color-regulating module that can improve the usage of light.

2. Related Art

The image display device is used to project an image on a screen for display or teaching purposes. The image display device uses a picture generation device to produce all kinds of images. It has to provide beams of light with rapid and periodic color changes in order to form a color picture. Therefore, most of the image display devices utilize the design of a color wheel to satisfy such a requirement.

The color wheel is composed of a plurality of color filters, by which light is filtered to allow only a monotonic color beam to pass. The color wheel is rotating in such a way that the color filters are rotated to the optical path to provide beams of light with rapid and periodic color changes. Since it needs a rotating color wheel to change colors, the color filters are often made in wedge shapes and attached on a substrate to form the color wheel. The color wheel is then installed on a motor.

However, a generic problem with the color wheel is that the usage efficiency of light is fairly low. This is because the color wheel is generally composed of red (R), green (G) and blue (B) filter thin films and blank parts. The R, G and B colors have equal areas and occupy 85% of the total area. The rest part is blank. When a beam of light passes through places without a color thin film, all colors of light can pass through. However, when the beam of light passes through the red color thin film, all colors of light will be filtered away except for the red light. Therefore, only one third of light can pass. Analogously, the green and blue filter thin films work in the same way. Excluding the 15% blank area, optical energy that can pass through the color wheel is roughly 40% of the original optical energy emitted. Considering the optical loss, the true optical energy that can be used is only slightly more than 30%.

This is an essential point that the efficiency of the image display device cannot be increased. Although some method had been proposed to solve the problem, they either cost too much or involve complicated and difficult process in manufacturing.

SUMMARY OF THE INVENTION

In view of the above-mentioned problems, the invention provides a rotating periodic color-regulating module of the image display device, which can increase the usage of light but does not increase the manufacturing cost.

According to the disclosed module, a mirror is provided on the entering place of light to reflect light reflected by the color filters on the color wheel. This can effectively increase the usage of light.

To increase the light use, a grating element is installed at the entering place of light. When a beam of light passes the grating element, it is split into several beams of light according to different wavelengths moving toward the corresponding filters. This further increases the percentage of light that passes through the color wheel. A color separating light guide is installed after the filter so that light is guided to emit homogeneously. Although such a method can increase the usage of light, it cannot be directly applied to image display devices because they need beams with color changed rapidly and periodically in order to convert them into images.

Therefore, a color-regulating module is provided at the light output place. It is a polygonal prism, which is mounted on a rotating motor to rotate. When a beam of light passes through the prism, it is deflected by an angle due to the different refraction indices between the prism and the air. Light of different wavelengths will be deflected by different angles too. As the prism rotates to a specific angle, light will greatly change its deflection angle and therefore the outgoing beams. With the combination of a high-speed rotating prism and the above-mentioned homogeneous light, beams of light with rapidly and periodically color changes can be provided to an image display device. Therefore, the disclosed module does not only increase the use of light, but has a simple structure that allows mass production at a lower cost.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
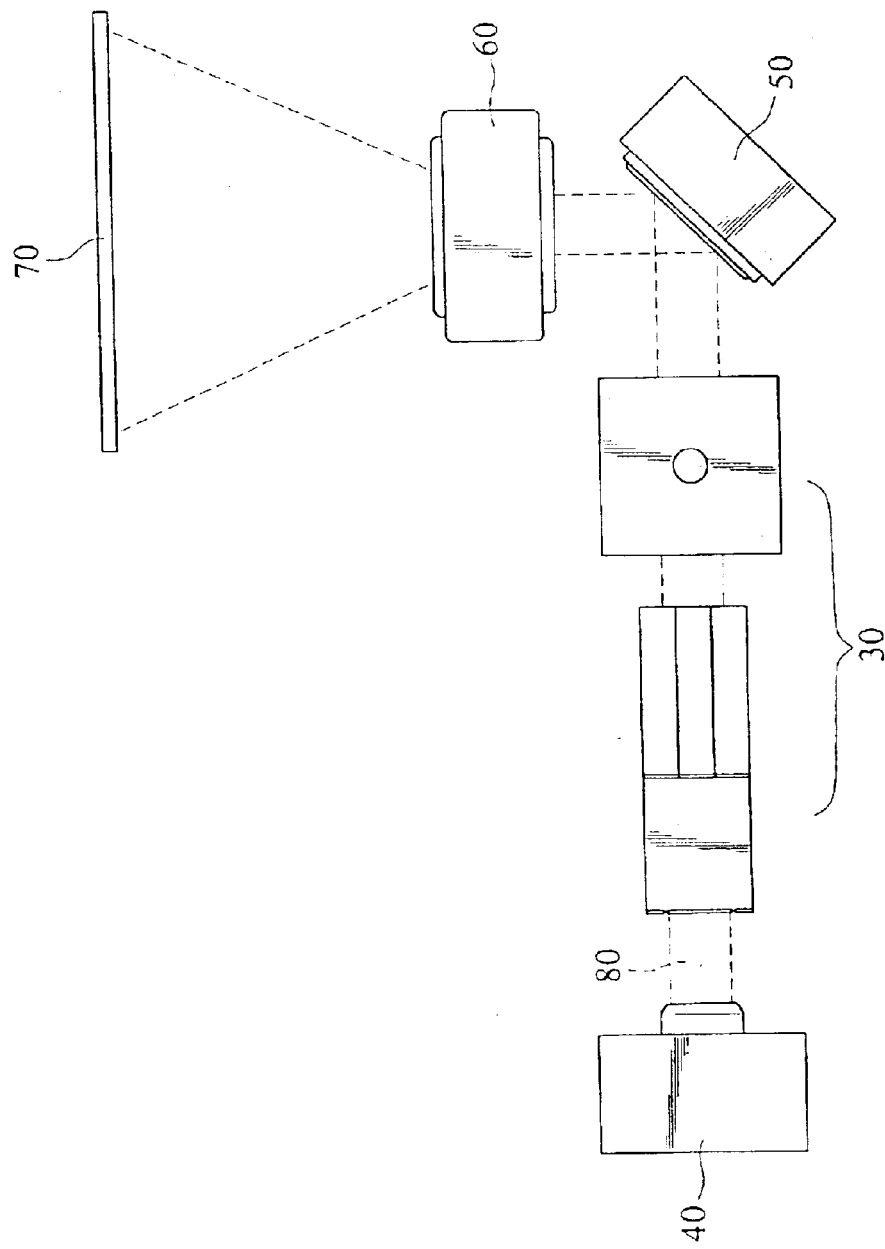
FIG. 1 is a schematic view of the invention combined into an image display device.

With reference to FIG. 1, the disclosed rotating periodic color-regulating module 30 is designed for an image display device. In addition to the rotating periodic color-regulating module 30, the image display device further includes a light source system 40, a picture generation device 50, and an optical projection system 60. The rotating periodic color-regulating module 30 can modulates an incident beam of light 80 emitted from the light source system 40 into different colors and projects them on a screen 70 via the picture generation device 50 and the optical projection system 60.

Figure 2:
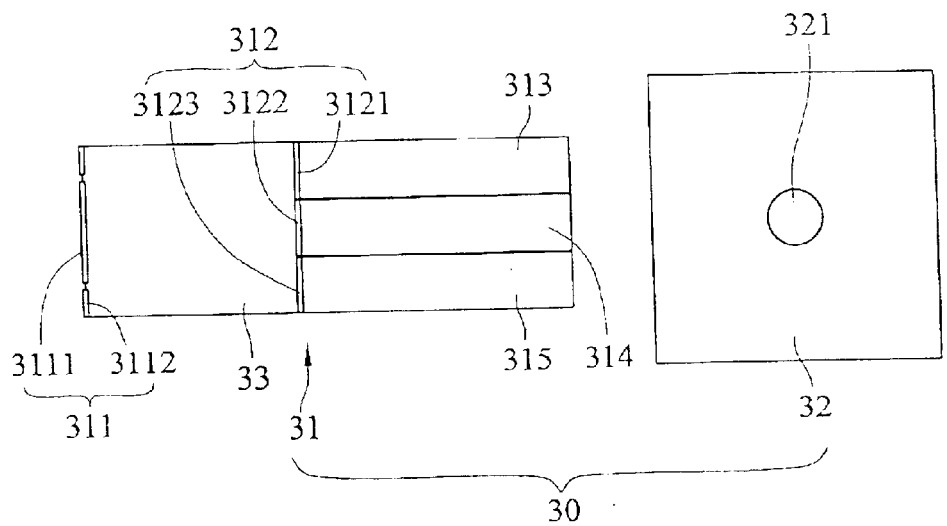
FIG. 2 is a schematic view of the structure of the invention.
Figure 3A:
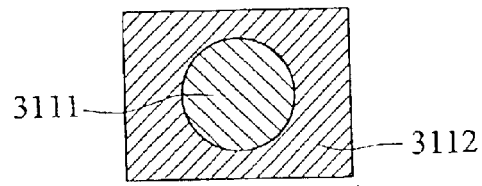
FIG. 3A is a side view of the disclosed light guiding device.

In view of the fact that light filtered by the filter thin films on a color wheel cannot be reused effectively, we provide a mirror at the entering place of light to further reflect light reflected by the filters back to the filters. This can increase the usage of light. The structure of the rotating periodic color-regulating module 30 is schematically shown in FIG. 2. It includes a color separating light guide 31 and a color-regulating processor 32. The color separating light guide 31 includes a beam splitter 33 and a plurality of light guiding elements, such as the first light guiding element 313, the second light guiding element 314, and the third light guiding element 315 shown in the drawing. The beam splitter 33 has an input terminal 311 and an output terminal 312. A grating element 3111 is provided in the middle of the input terminal 311 and is surrounded by a mirror 3112 (shown in FIG. 3A). The output terminal 312 is installed with filters corresponding to the guiding elements. In the drawing, there are a first color filter 3121, a second color filter 3122, and a third color filter 3123 corresponding to the first, second and third light guiding elements 313, 314 and 315, respectively.

Figure 3B:
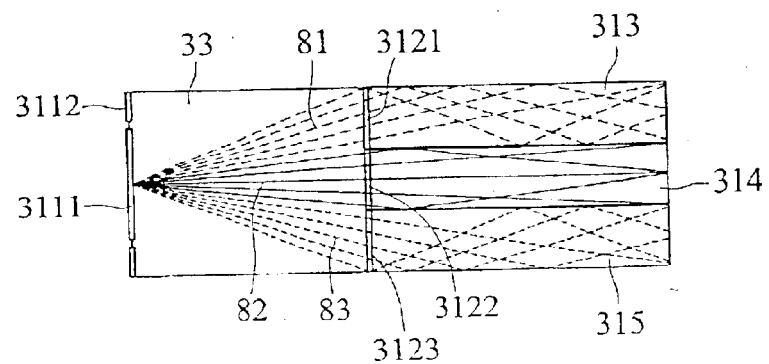
FIG. 3B is a schematic view of the disclosed guiding device guiding the optical path.

As shown in FIG. 3B, when an incident beam 80, as shown in FIG. 1, enters the input terminal 311 and hits the beam splitter 33, it is split into several beams by the grating 3111. In the drawing, it is split into a first beam 81, a second beam 82, and a third beam 83 moving toward the first, second and third light guiding elements 313, 314 and 315, respectively. In practice, it is preferred to split the light into beams with red (R), green (G), and blue (B) wavelengths. In effect, the grating element 3111 is not able to completely split the incident beam into the R, G, and B beams, but only focuses most of the energy of the colors within the corresponding beams. By controlling the properties of the grating element 3111, the lengths of the beam splitter 33, the distribution of the first color filter 3121, the second color filter 3122, and the third color filter 3123, the first beam 81, the second beam 82, and the third beam 83 roughly propagate toward the first color filter 3121, the second color filter 3122, and the third color filter 3123, respectively. The first color filter 3121, the second color filter 3122, and the third color filter 3123 are designed such that only light with specific wavelengths in the first beam 81, the second beam 82, and the third beam 83 can pass through. Thus, most of the initial incident beam of light can pass through the first color filter 3121, the second color filter 3122, and the third color filter 3123. In practice, it is impossible for all the beams to pass through those color filters completely. Part of the light is reflected by the three color filters back to the input terminal 311. The grating element 3111 positioned at the input terminal 311 is surrounded by a mirror 3112. Therefore, the reflected light from the color filters is reflected again back to the corresponding three filters. At this point, the light beams partially penetrate through the corresponding color filters again and enter the light guiding elements 313, 314 and 315. With such reflections back and forth, the usage of light can be increased to more than 40% or even close to 50%.

Figure 4A:
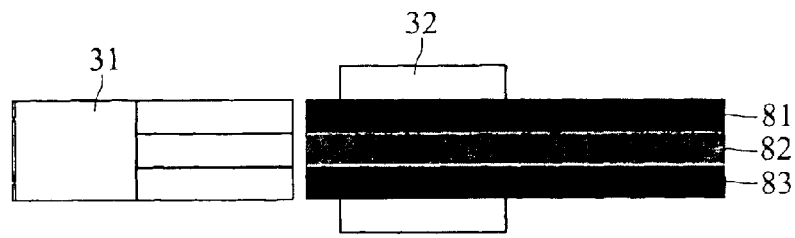
FIGS. 4A to 4J are schematic views of color-regulating processes according to the invention.

After passing through the first color filter 3121, the second color filter 3122, and the third color filter 3123, the first beam 81, the second beam 82, and the third beam 83 enter the first light guiding element 313, the second light guiding element 314, and the third light guiding element 315, respectively. The beams keep bouncing off the walls of the guiding elements until they come out from the other sides homogeneously, as shown in FIG. 4A. The beams coming out of the guiding elements enter the color-regulating processor 32, which is basically a polygonal prism mounted on a rotational axis 321. The rotational axis 321 is driven by a motor (not shown) into rotation. It in turn brings the color-regulating processor into rotation.

Figure 4B:
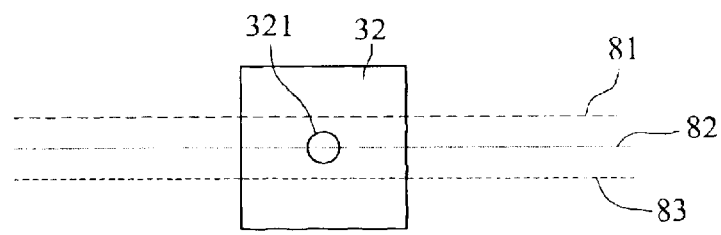
Figure 4C:
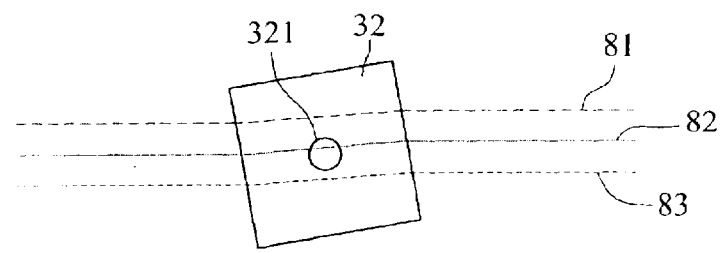
Figure 4D:
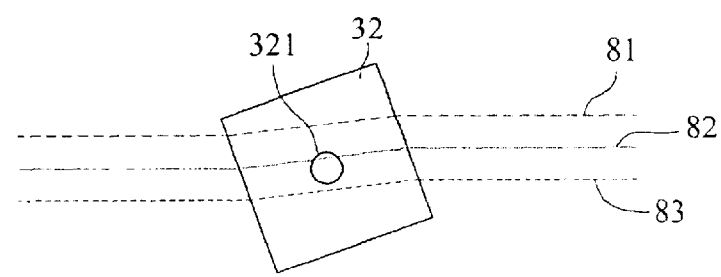
Figure 4E:
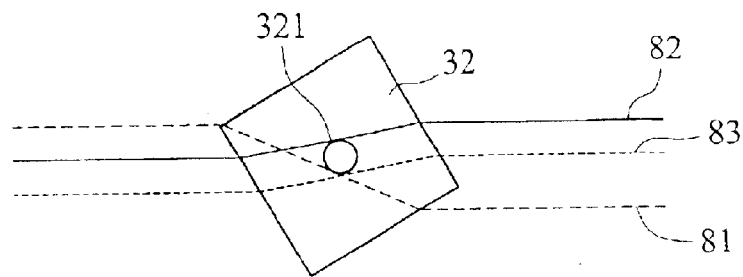
Figure 4F:
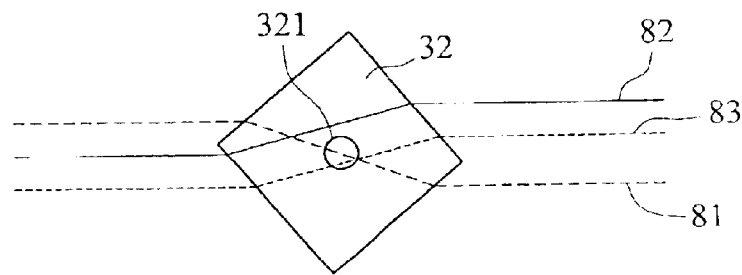
Figure 4G:
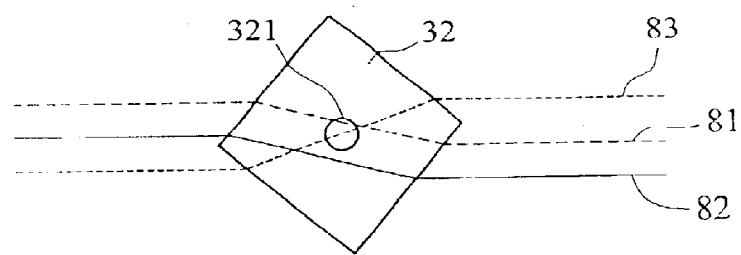
Figure 4H:
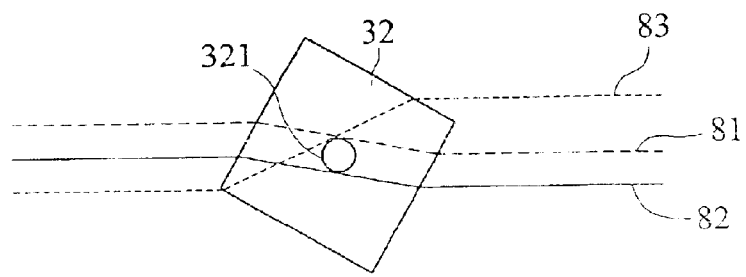
Figure 4I:
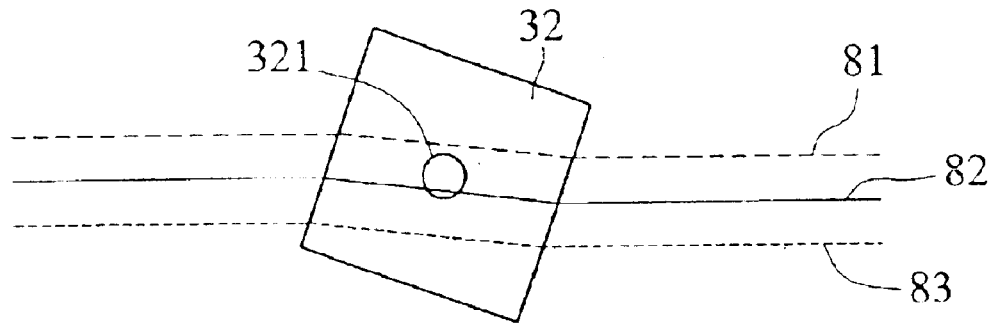
Figure 4J:
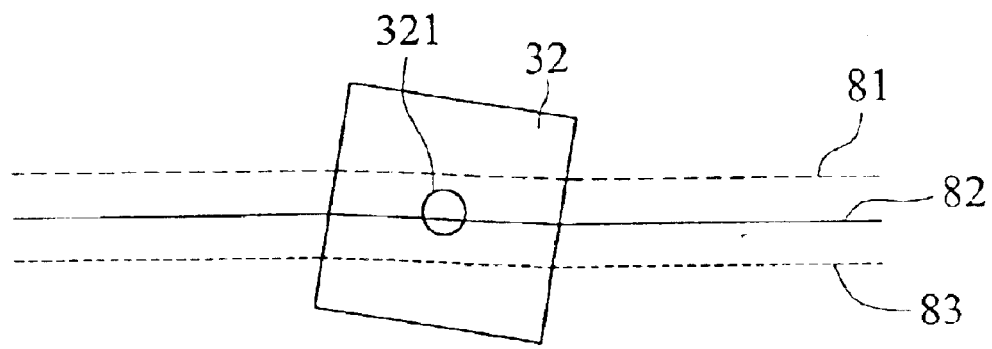

According to the Snell's Law, one learns that the outgoing beams will have different angles as the prism rotates, resulting in deflected beams of light. Therefore, when the first beam 81, the second beam 82, and the third beam 83 are deflected when passing through the color-regulating processor 32. As shown in FIG. 4B, if the incident direction is perpendicular to the side surface of the prism, the beam is supposed to come out also perpendicularly form the other side. When the prism rotates counterclockwise, the outgoing directions of the first beam 81, the second beam 82, and the third beam 83 are shifted slightly upward (FIG. 4C). As the prism continues rotating, the outgoing directions also move up (FIG. 4D). When rotating to a specific angle, the first beam 81 is deflected to an adjacent different side. The deflected angle increases to under the second beam 82 and the third beam 83 (FIG. 4E). Similarly, the second beam 82 is deflected to the lower side (FIGS. 4F and 4G). Finally, the third beam 83 is also deflected (FIGS. 4H and 4I). As the rotational angle increases (FIG. 4J) to 90 degrees, the situation goes back to FIG. 4A, with the beams perpendicularly penetrating through. Consequently, as the prism rotates at a high speed, the first beam 81, the second beam 82, and the third beam 83 continuously change their outgoing direction, providing rapid periodic color changes to the image display device. Of course, the first beam 81, the second beam 82, and the third beam 83 in FIGS. 4B to 4J are just schematic views of the optical paths. The actual light distribution should be similar to FIG. 4A, which is a homogeneous outgoing beam. In order to easily control the outgoing range of the beams, the number of sides of the prism is preferably even.

EFFECTS OF THE INVENTION

The invention is a rotating periodic color-regulating module of the image display device. A grating element is first used to split an incident beam into three beams with different wavelengths R, G and B, going to the respective color separating light guide. Filters and a reflective mirror around the grating element are installed in such a way that the light beams reflected from the filters are totally reflected to enter the corresponding filters again. This can effectively increase the usage of light. After passing through the filters, the light beams are guided and homogenized to enter a polygonal prism through three corresponding light guiding elements. As the prism rotates at a high speed, beams of different wavelengths will be deflected by different angles. This in turn changes the outgoing directions of the beams, thereby providing desired colors to the image display device for displaying images. The invention can greatly increase the usage rate of light. Moreover, it has a simple structure and a low manufacturing cost. Therefore, it is ideal for mass production in the industry.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A high-efficiency color separating light guide for splitting an incident beam of light into beams of different wavelength propagating outward, the color separating light guide comprising:

a beam splitter, which has two opposite terminals, one installed with a grating element surrounded by a reflective mirror so that the light enters and leaves via the grating element and the other terminal;

a plurality of light guiding elements adjacent to the other terminal of the beam splitter for allowing light to pass through; and a plurality of filters respectively installed on the same side of the corresponding guiding elements adjacent to the beam splitter;

wherein after entering the beam splitter via the grating element, the incident beam is split according to different wavelength into a plurality of beams propagating toward the light guiding elements and passing through the filters installed in front of the corresponding light guiding elements, the light of different wavelengths is filtered and homogeneously propagates outward from the other terminal of the light guiding elements, and the light reflected by the filters is further reflected by the reflective mirror around the grating to re-enter the filters.

2. The high-efficiency color separating light guide of claim 1, wherein the grating element splits the incident light into beams of red (R), green (G), and blue (B) wavelengths.

3. The high-efficiency color separating light guide of claim 1, wherein the grating element is surrounded by a reflective mirror for constraining the light.

4. A rotating periodic color-regulating module for regulating the color of an incident beam of light from the exterior, the rotating periodic color-regulating module comprising:

a color separating light guide, which splits the incident beam into a plurality of beams with different wavelengths propagating outward and comprises:

a beam splitter, which has two opposite terminals with one terminal being installed with a grating element surrounded by a reflector mirror so that the light enters and leaves only via the grating element and the other terminal;

a plurality of light guiding elements, which is installed close to the other terminal of the beam splitter for beams to pass through; and a plurality of filters respectively installed on the same side of the corresponding light guiding elements adjacent to the beam splitter;

wherein after entering the beam splitter via the grating element, the incident beam is split according to different wavelength into a plurality of beams propagating toward the light guiding elements and passing through the filters installed in front of the corresponding light guiding elements, the light of different wavelengths is filtered and homogeneously propagates outward from the other terminal of the light guiding elements, and the light reflected by the filters is further reflected by the reflective mirror around the grating element to re-enter the filters; and a color-regulating processor, which is installed on the other side of each light guiding element from the corresponding filter for receiving homogeneous light emitted from the light guiding element and comprises:

a rotational axis;

a rotational motor, which drives the rotational axis into rotation; and a polygonal prism, which is installed on the rotational axis for rotation and receives the incident light for the incident light to pass through and propagate out from the opposite side;

wherein the rotation of the prism deflects the incident light and periodically changes the outgoing positions of the beams of different wavelengths.

5. The rotating periodic color-regulating module of claim 4, wherein the grating element splits the incident light into beams of red (R), green (G), and blue (B) wavelengths.

6. The rotating periodic color-regulating module of claim 4, wherein the grating element is surrounded by a reflective mirror for constraining the light.

7. The rotating periodic color-regulating module of claim 4, wherein the polygonal prism preferably has an even number of sides.

8. An image display device, which comprises a light source system, a picture generation device, and a rotating periodic color-regulating module;

wherein the light source system emits an incident beam of light toward the rotating periodic color-regulating module for regulating its colors and the picture generation device converts the colors into an image that is to be projected on a screen, the rotating periodic color-regulating module comprising:

a color separating light guide, which splits the incident beam into a plurality of beams with different wavelengths propagating outward and comprises:

a beam guide, which has two opposite terminals with one terminal being installed with a grating element surrounded by a reflector mirror so that the light enters and leaves only via the grating element and the other terminal;

a plurality of light guiding elements, which is installed close to the other terminal of the beam splitter for beams to pass through; and a plurality of filters installed on the same side of the corresponding light guiding elements adjacent to the beam splitter;

wherein after entering the beam splitter via the grating element, the incident beam is split according to different wavelength into a plurality of beams propagating toward the light guiding elements and passing through the filters installed in front of the corresponding light guiding elements, the light of different wavelengths is filtered and homogeneously propagates outward from the other terminal of the light guiding elements, and the light reflected by the filters is further reflected by the reflective mirror around the grating element to re-enter the filters; and a color-regulating processor, which is installed on the other side of each light guiding element from the corresponding filter for receiving homogeneous light emitted from the light guiding element and comprises:

a rotational axis;

a rotational motor, which drives the rotational axis into rotation; and a polygonal prism, which is installed on the rotational axis for rotation and receives the incident light for the incident light to pass through and propagate out from the opposite side;

wherein the rotation of the prism deflects the incident light and periodically changes the outgoing positions of the beams of different wavelengths.

9. The image display device of claim 8, wherein the grating splits the incident light into beams of red (R), green (G), and blue (B) wavelengths.

10. The image display device of claim 8, wherein the grating is surrounded by a reflective mirror for constraining the light.

11. The image display device of claim 8, wherein the polygonal prism preferably has an even number of sides.

* * * * *